Patented Apr. 1, 1952

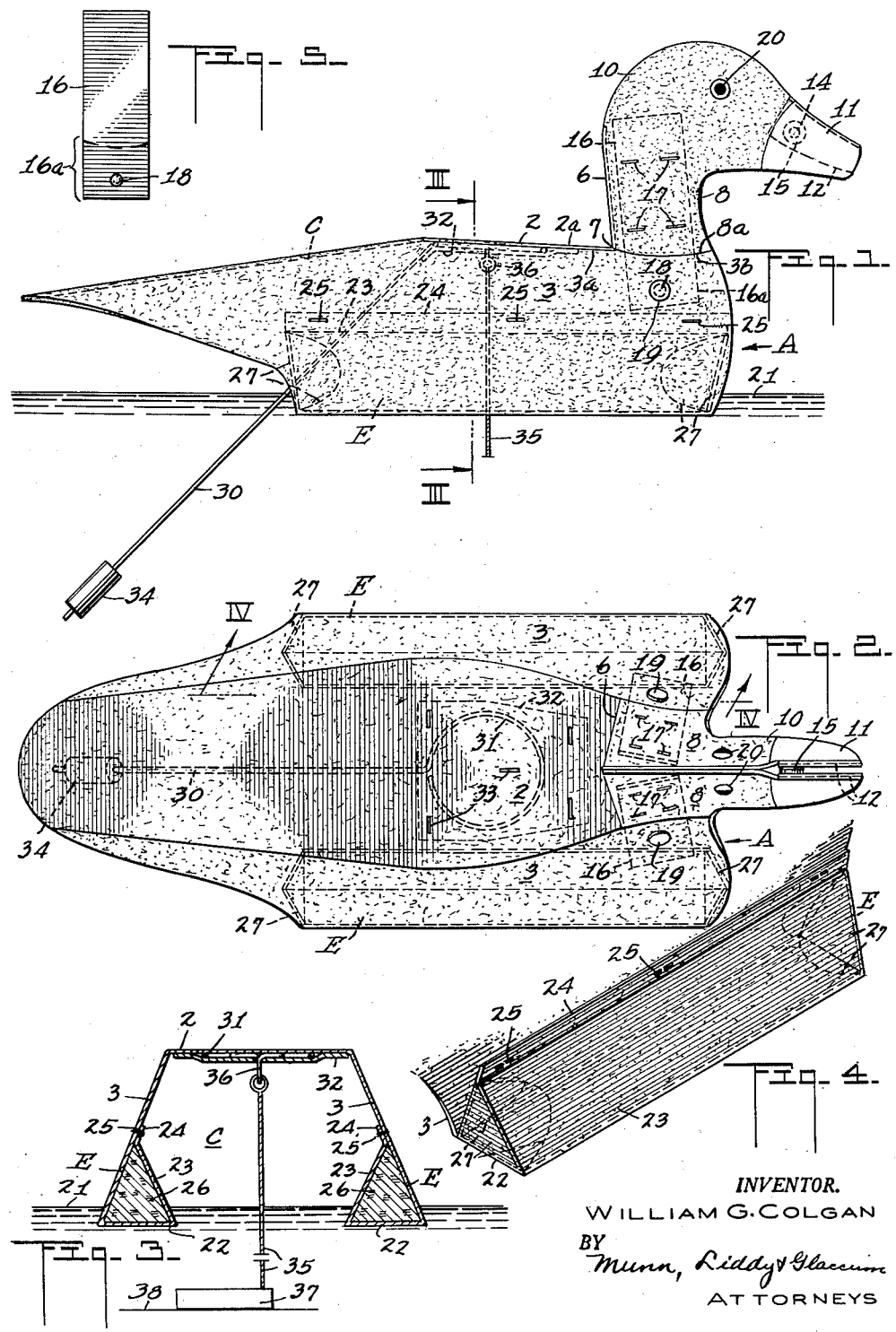

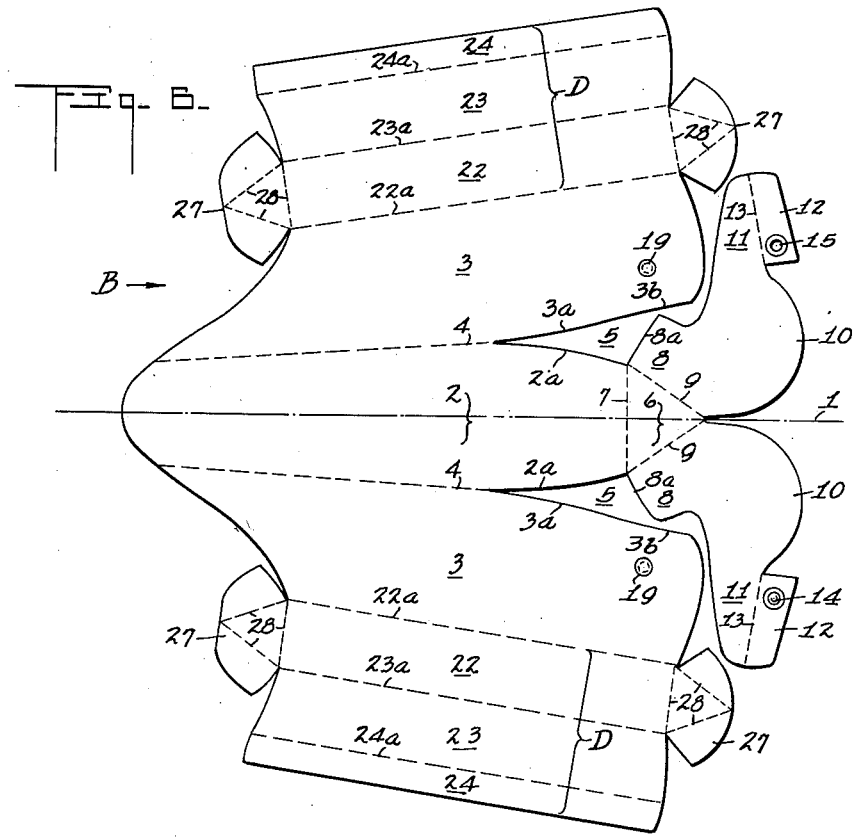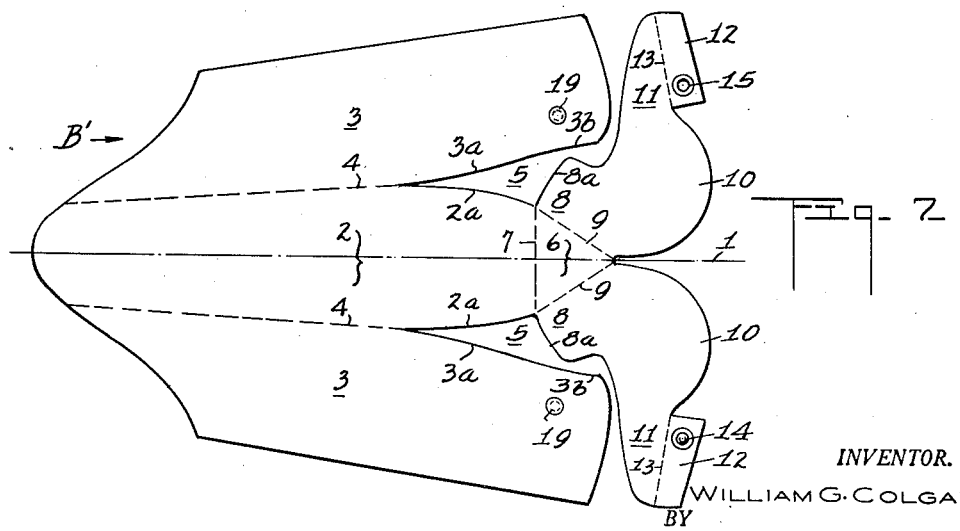

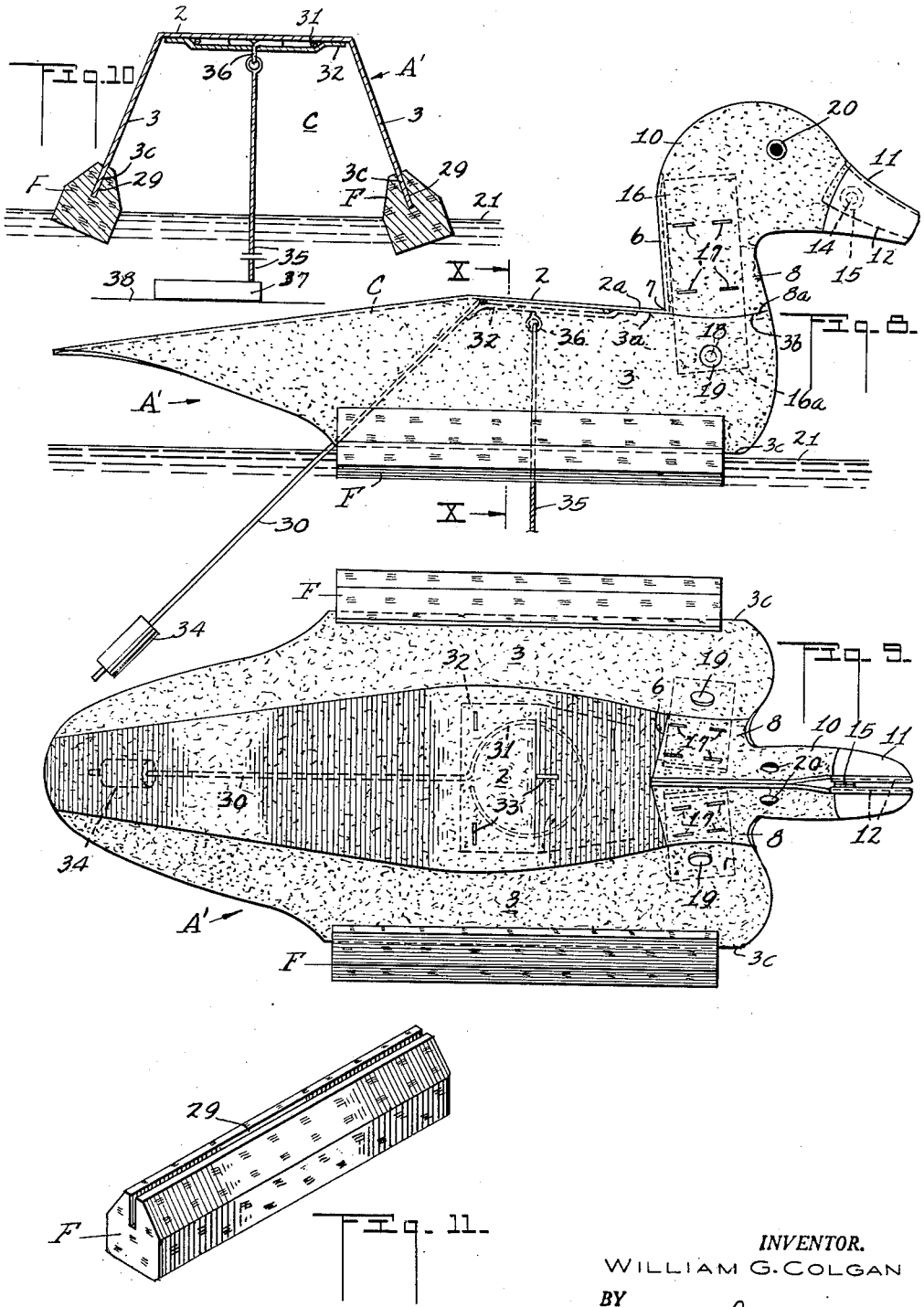

2,590,842

UNITED STATES PATENT OFFICE 2,590,842

DECOY

William G. Colgan, Oakland, Calif.

Application February 19, 1946, Serial No. 648,576

8 Claims. (Cl. 43—3)

1

The present invention relates to improvements in decoys, and it consists of the combinations, constructions and arrangement of parts hereinafter described and claimed.

An object of my invention is to provide an improved form of decoy to be used by sportsmen in attracting wild game and alluring the latter within gun range. It is particulary proposed to fashion the decoy from a foldable blank, which may be formed by a stamping operation. These blanks may be packaged in knock-down condition, and readily assembled when they are to be displayed by the sportsmen on ponds, lakes and the like.

It is further proposed to provide a decoy of the character described, which is designed in such a manner as to prevent the decoy from overturning when struck by waves or wind. In accomplishing this feature, I provide an uninterrupted channel that extends lengthwise through the decoy for allowing the waves, wind and tide to pass therethrough.

Another object of my invention resides in the provision of a mooring line and ballast means, both of which are attached to the decoy at such places as to aid in retaining the decoy in upright floating position; while allowing the decoy to swing in accordance with the wind and tide or current. The ballast means are made adjustable in order to give the decoy the proper attitude in the water under prevailing conditions.

A still further object is to provide floats for the decoy, which are disposed to make the decoy buoyant without interfering with the above-mentioned channel that extends lengthwise through the decoy.

Other objects and advantages will appear as the specification continues, and the novel features will be set forth in the appended claims.

For a better understanding of my invention, reference should be had to the accompanying drawings, forming part of this application, in which:

Figure 1 is a side elevation of one form of a decoy constructed in accordance with the present invention;

Figure 2 is a top plan view thereof;

Figure 3 is a transverse sectional view taken along the line III—III of Figure 1;

Figure 4 is a perspective view of one of the floats when seen from the line IV—IV of Figure 2.

Figure 5 is a plan view of one of the strips that I employ for holding the head of the decoy in adjusted position;

Figure 6 is a development view of the blank

2 that I use for forming the decoy shown in Figures 1 to 4, inclusive;

Figure 7 is a development view of a modified blank for fashioning the decoy illustrated in Figures 8 to 10, inclusive;

Figure 8 is a side elevation of the modified decoy;

Figure 9 is a top plan view of the modification;

Figure 10 is a transverse sectional view taken along the line X—X of Figure 8; and Figure 11 is a perspective view of the float that I use on the modified decoy.

While I have shown only the preferred forms of my invention, it should be understood that various changes, or modifications, may be made within the scope of the claims hereunto annexed without departing from the spirit thereof.

Referring now to the form of my decoy, as shown in Figures 1 to 6, inclusive, it will be noted that I provide a decoy indicated generally at A, which is fashioned from the blank B shown in Figure 6. This blank may be made of any suitable material, such as cardboard that is made waterproof by paraffin wax, or the like, so as to make it impervious to water. The blank may be cut out by a stamping operation, and the blanks nested one above the other for shipping. The material forming the blank may be folded in the manner hereinafter described so that the decoys may be assembled by the sportsmen.

The blank B is fashioned with two identical halves, which are symmetrically disposed with respect to the longitudinal center line 1 thereof. The blank includes a back 2 for the decoy having sides 3 projecting laterally therefrom. Score lines 4 are provided on the blank to facilitate folding of the sides 3 relative to the back 2 in such manner that the former will depend angularly from the latter as disclosed in Figure 3 when the decoy is assembled.

In Figure 6, I disclose a space 5 in each half of the blank, which is formed by cutting out part of the material during the stamping operation. The edges 2a of the back will overlie and abut the edges 3a of the sides upon assembling the decoy. It will be observed that a triangular portion 6 is arranged at the forward part of the back 2. When the portion 6 is folded along a score line 7 into the position shown in Figure 1, the triangular portion will constitute the rear of the neck for the decoy.

Each half of the blank B is provided with a neck 8 that is joined to the triangular portion 6 along scored lines 9. These neck portions carry heads 10 terminating in bills 11. When the blank is flat, the combined necks and heads extend away from the center line 1. However, when the necks are folded along the score lines 9, the heads 10 will abut one another as hown in Figure 2.

Tabs 12 are formed integral with the bills, and these tabs are foldable along score lines 13 so as to face each other and extend downwardly between the bills 11 (see Figures 1 and 2). A stud 14 projects from one of the bill tabs and is engageable with a snap fastener 15 carried by the other bill tab, thus holding the bills in assembled or folded position.

The edges 8a of the necks 8 are slightly curved and rest upon edges 3b of the sides 3 when the decoy is fully assembled. Strips 16 are stapled at 17, or otherwise secured, to the inner surfaces of the necks 8 with the lower sections 16a of the strips projecting beyond the curved edges 8a. These projecting strip ends have studs 18 (see Figure 5), which are engageable with snap fasteners 19 carried by the sides 3 for holding the heads 10 in adjusted position. The studs 18 and snap fasteners 19 also hold the edges 2a and 3a in contact with each other. Decorative eyes 20 are attached to the heads of the decoy.

Referring now to Figures 1 and 3, it will be noted that an inverted channel C is defined by the back 2 and the spaced-apart sides 3. This channel is uninterrupted and extends lengthwise of the body, the front and rear ends of the latter being open. This channel will permit waves or wind to pass therethrough that will aid in preventing the decoy from overturning in the water 21 on which the decoy floats.

The sides 3 of the blank B have been illustrated in Figure 6 as having extensions D formed thereon. Each of these extensions include three parallel and rectangular sections 22, 23 and 24. Score lines 22a are formed between the sides 3 and sections 22; while score lines 23a divide the sections 22 and 23. Likewise, score lines 24a divide the sections 23 and 24. Figure 3 discloses the sections 22 as being folded inwardly toward each other and subsequently the sections 23 are folded upwardly so that the sections 24 will abut the inner surfaces of the sides 3. The sections 24 now are stapled, or otherwise secured, as at 25 to the sides 3 of the decoy.

The sections 22 to 24, inclusive, define pockets E that extend longitudinally of the decoy body in parallel relation with each other. These pockets are filled with buoyant material 26, such as cork or kapok, in order to provide floats for the decoy. Flaps 27 are provided at opposite ends of the sections 22, and these flaps are foldable along score lines 28 and thereafter may be inserted into the pockets E for closing the ends of the latter and retaining the buoyant material 26 in place.

The blank B' shown in Figure 7 is identical with the blank B, excepting for the fact that the extensions D are omitted. Therefore, like reference numerals will be applied to corresponding parts. The decoy A' illustrated in Figures 8 to 10, inclusive, is fashioned from the blank B'.

Referring to the modification covered by Figures 8 to 11, inclusive, it will be noted that I provide a pair of floats F having longitudinally-extending recesses 29 fashioned in the upper surfaces thereof. The lower edges 3c of the spaced-apart sides 3 are frictionally telescoped into the recesses 29 for removably anchoring the floats to the decoy body.

In order to ballast the decoys A and A' properly, and especially when the water is moving or the wind is blowing, I make use of a bendable wire 30. The upper end of this wire is ring-shaped, as at 31, and the ring is clamped between the back 2 and a plate 32. Staples 33, or other suitable fastening means, hold the plate 32 to the back 2. The lower part of the wire 30 carries a ballast weight 34.

Particular attention is directed to the fact that the wire 30 extends downwardly through the channel C. The latter allows freedom of adjustment of the wire by bending so that the ballast weight 34 can be correctly positioned with respect to the decoy to compensate for tide, currents or winds prevailing at the time the decoy is placed in the water. The high point of attachment of the wire 30 to the back 2 will aid in stabilizing the decoy and preventing the latter from overturning.

A mooring line 35 is fastened at its upper end to the plate 32 by means of a cotter pin 36, or other suitable fastening means. The lower end of the mooring line extends through the channel C and is attached to an anchor 37 disposed on the floor 38 of the body of water. Pull on the line 35, due to the decoy moving with the tide, current or wind, will have a tendency to hold the decoy in upright position instead of overturning it. This is due to the high point on the decoy to which the line 35 is secured.

Having thus described the various parts of my decoys A and A' and the assembly thereof, the operation of the decoys may be readily understood. The sportsmen will place the decoys in the selected locations on the body of water 21 and adjust the mooring lines 35 so that the anchors 37 will come to rest on the floor 38 of the lake, stream, or the like. The bendable wires 30 then are given the proper amount of bend in order to properly elevate the heads 10 of the decoys and compensate for tides, currents and wind. Waves, winds and currents striking the decoys will pass through the inverted and uninterrupted channels C, thus preventing the decoys from overturning.

Although I have shown a duck in the drawings by way of illustration, it should be made clear that a goose could be provided by merely making the triangular portion 6 higher and the necks 8 longer.

I claim:

1. In a decoy; a body, including a back and spaced-apart sides; the front, rear and bottom of the body being open to define an inverted and uninterrupted channel extending lengthwise through the body; the sides having pockets formed therein; buoyant material disposed in the pockets to provide floats for the body; and a head surmounting the body.

2. In a decoy; a foldable body, including a back and spaced-apart sides; the sides being turned back upon themselves to provide pockets; means for securing the turned-back portions to the body sides; buoyant material disposed in the pockets to provide floats for the body; and a head surmounting the body.

3. In a decoy; a foldable body, including a back and spaced-apart sides; the sides being turned back upon themselves to provide pockets extending lengthwise of the body; means for securing the turned-back portions to the body sides; buoyant material disposed in the pockets to provide floats for the body; flaps for closing the ends of the pockets; and a head surmounting the body.

4. In a decoy; a body, including a back and spaced-apart sides; the front, rear and bottom of the body being open to define an inverted and uninterrupted channel extending lengthwise through the body; independent floats removably secured to the bottom portions of the sides; and a head surmounting the body.

5. The combination as defined in claim 4 in which the independent floats have longitudinally-extending recesses fashioned in the upper surfaces thereof; the lower portions of the body sides being frictionally telescoped into the recesses of the floats.

6. In a floatable decoy of the character described: a unitary foldable blank for a decoy consisting of two identical halves symmetrically disposed with respect to the longitudinal center line of the blank; each half including a back portion having a side projecting laterally therefrom, and a combined neck portion and head portion projecting forwardly from the back portion and terminating in a bill portion extending away from said center line; each side having an extension at its outer edge adapted to be folded back upon its respective side to provide a pocket extending longitudinally of the body for receiving a buoyant material.

7. In a floatable decoy of the character described: a unitary foldable blank for a decoy consisting of two identical halves symmetrically disposed with respect to the longitudinal center line of the blank; each half including a back portion having a side projecting laterally therefrom, and a combined neck portion and head portion projecting forwardly from the back portion and terminating in a bill portion extending away from said center line; each side having an extension at its outer edge adapted to be folded back upon its respective side to provide a pocket extending longitudinally of the body for receiving a buoyant material; and flaps carried by each extension for closing the opposite ends of said pockets.

8. In a decoy: a body, including a back and spaced-apart sides; the sides having free lower edges; the front, rear and bottom of the body being entirely open at all times when the decoy is in use to define an inverted and uninterrupted channel extending upwardly into the body from said free edges, with the channel further extending throughout the entire length of the body; and ballast means, including a bendable wire, anchored to the back and projecting downwardly through the channel and into the water on which the decoy floats; the wire being bendable to extend through the uninterrupted channel at any point desired within the limits of said free edges.

WILLIAM G. COLGAN.

REFERENCES CITED

The following references are of record in the file of this patent:

UNITED STATES PATENTS

| Number | Name | Date |
|---|---|---|
| 364,573 | Brinkop | June 7, 1887 |
| 776,905 | Green | Dec. 6, 1904 |
| 1,195,652 | Caldwell | Aug. 22, 1916 |
| 1,460,616 | Starbuck | July 3, 1923 |
| 1,603,114 | Johnson | Oct. 12, 1926 |
| 1,663,009 | Johnson | Mar. 20, 1928 |
| 1,718,384 | Sherman | June 25, 1929 |
| 1,951,429 | Massie | Mar. 20, 1934 |
| 2,066,591 | Torme | Jan. 5, 1937 |
| 2,148,290 | Cloud | Feb. 21, 1939 |
| 2,170,953 | Spots | Aug. 29, 1939 |
| 2,195,745 | Gariepy | Apr. 2, 1940 |
| 2,263,911 | Wilson | Nov. 25, 1941 |
| 2,395,247 | Buffenbarger | Feb. 19, 1946 |

FOREIGN PATENTS

| Number | Country | Date |
|---|---|---|
| 500,732 | Great Britain | Feb. 15, 1939 |